Aug. 16, 1932.   F. GOLDFISHER   1,871,685
RADIATOR SHUTTER
Filed May 13, 1929   2 Sheets-Sheet 2
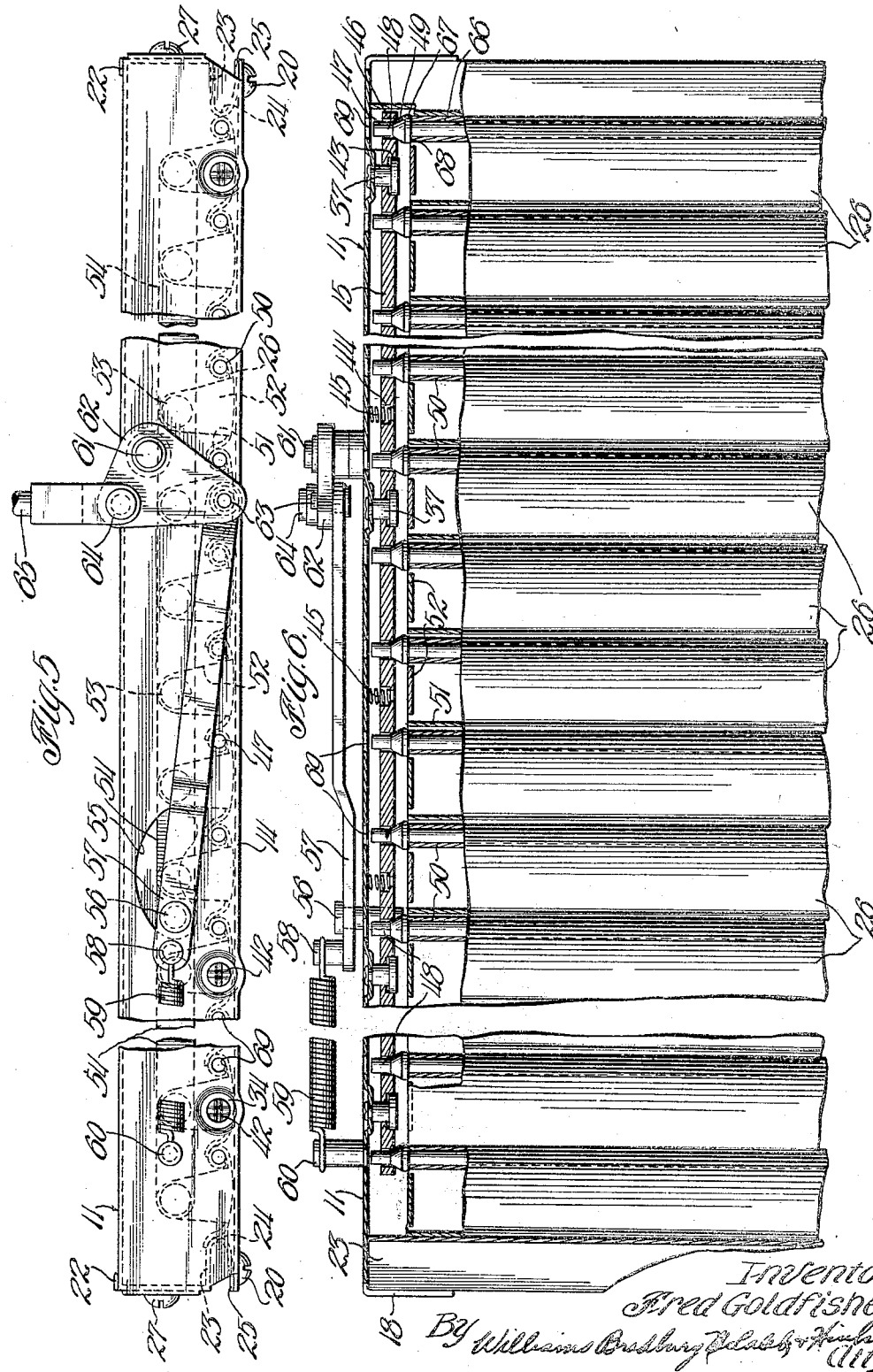
Inventor:
Fred Goldfisher
By Williams Bradbury Black & Huhle
Attys.

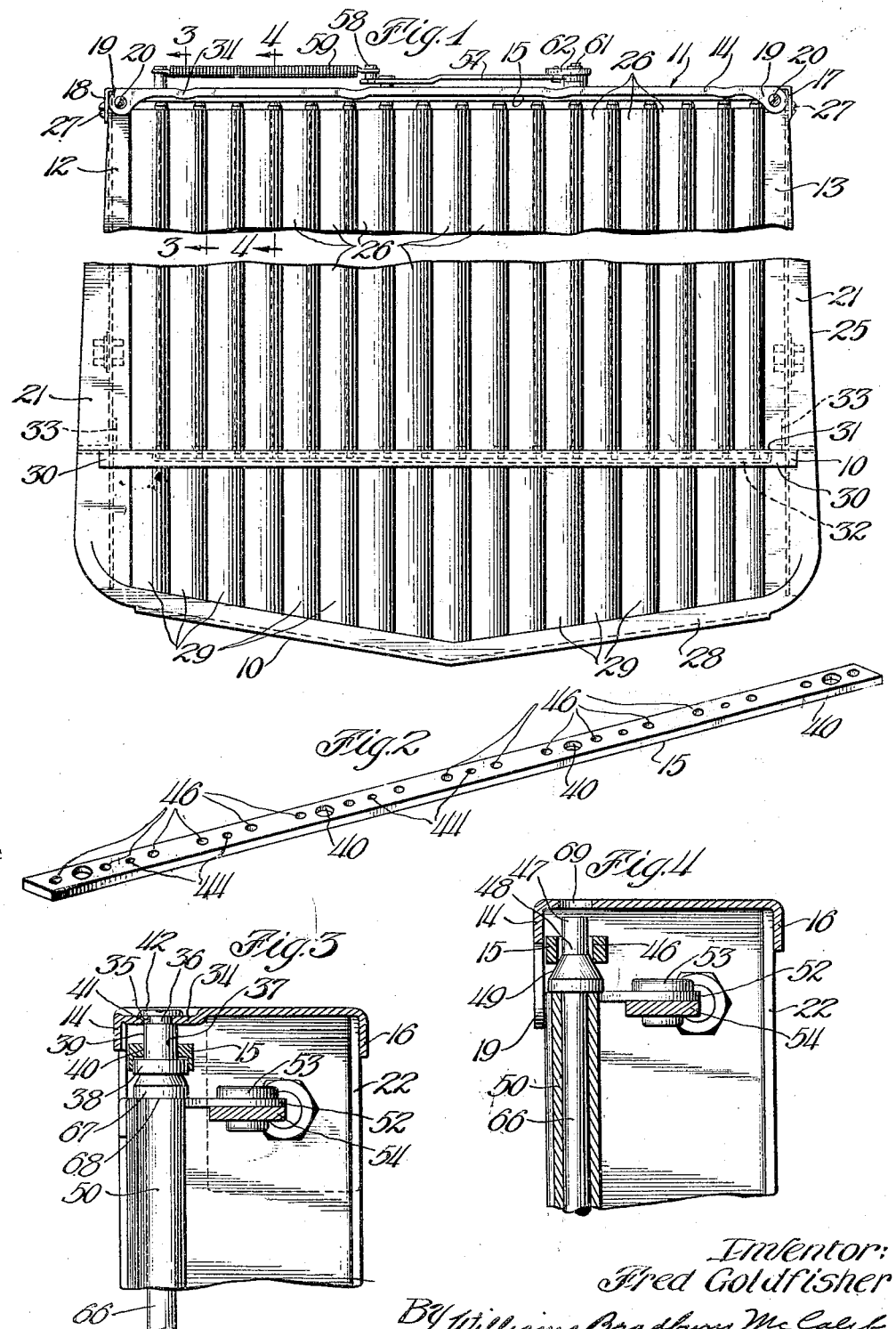

Patented Aug. 16, 1932

1,871,685

UNITED STATES PATENT OFFICE

FRED GOLDFISHER, OF CHICAGO, ILLINOIS, ASSIGNOR TO PINES WINTERFRONT COMPANY, OF CHICAGO, ILLINOIS, A CORPORATION OF DELAWARE

RADIATOR SHUTTER

Application filed May 13, 1929. Serial No. 362,573.

The present invention relates to radiator shutters, and is particularly concerned with radiator shutters for internal combustion engines.

One of the objects of the invention is the provision of a radiator shutter structure which is adapted to automatically compensate for any wear of the shutter parts, to eliminate any possibility of rattling after use of the shutter for a long period of time.

Another object is the provision of a shutter structure in which the shutters move with a minimum of friction, the shutter pivots being provided with substantially a line contact bearing surface.

Another object is the provision of an improved shutter structure in which the moving parts are resiliently mounted to eliminate rattling and to compensate for wear upon the shutter pivots.

Another object is the provision of an improved shutter structure having a plurality of shutters resiliently mounted for rotation in a bearing strip, which is preferably also resilient in order to compensate for wear upon the shutter parts, and to compensate for irregularities in the dimensions of the respective shutters.

In brief, the invention consists primarily in an improved radiator shutter structure comprising one or more of the novel features described hereinafter, and which in the present embodiment consists of shutters having frusto-conical pivot members engaging in the cylindrical bores of a resiliently mounted bearing strip, whereby the pivot members have substantially a line contact, and by means of the resilient mounting and frusto-conical bearing surface, the bearing strips automatically center the shutters and are maintained in resilient engagement with the pivots to compensate for wear and eliminate rattling at all times.

Referring to the drawings, of which there are two sheets;

Fig. 1 is a front elevational view of a built-in shutter, constructed according to the present invention;

Fig. 2 is a view in perspective of the bearing strip;

Fig. 3 is a vertical section taken on a plane of line 3—3 of Fig. 1, looking in the direction of the arrows;

Fig. 4 is a similar view taken on the plane of the line 4—4 looking in the direction of the arrows;

Fig. 5 is a plan view of the shutter shown in Fig. 1;

Fig. 6 is an enlarged elevational view of the top of the shutter shown in Fig. 1, partially broken away to show the structure of the bearing strip and shutter trunnions.

The improved shutter structure of the present invention may be utilized in both vertical or horizontal shutters, and built-in or detachable shutters, and since the present structure may be used with either automatic shutters or shutters adapted to be manually actuated, the actuating device for the shutters will be be illustrated in detail.

The shutter frame of the present invention preferably includes an upper frame member 11, a lower frame member 10 and side frame members 12 and 13. The upper or end frame member 11 comprises a sheet metal strip preferably of steel, having a downwardly extending flange 14 on its front side adapted to reinforce the frame member and to enclose a non-rattling bearing strip 15 further to be described. The frame member 11 may also be formed with a depending flange 16 along its rear edge, for stiffening the same and at each end with downwardly extending flanges 17 and 18 for securing the frame member to the side frame members 12 and 13.

The forward flange 14 may be made broader adjacent each end as at 19, forming an auxiliary attaching flange for attachment to the side flanges of the side frame members 12 and 13 by means of screw bolts 20. The side frame members 12 and 13 may be identical in shape, except that where it is desired to provide these side frame members with aprons 21, the side frame members will be formed for the left and right hand, respectively. The side frame members 12 and 13 each consists of elongated sheet metal strips formed with a reinforcing flange 22 extending at right angles to the body of the side frame member along its rear edge. At the forward edge of the side frame members 12 and 13, they are provided with the inwardly extending flange 23 at substantially right angles to the body of the side frame member 13, and the flange 23 may be bent back upon itself as at 24 to form a shield or apron 25.

The apron 25 may taper in width from the bottom of the shutters to the top frame member 11 in order to provide a shield for covering a portion of the radiator between the shell and the shutters 26, and the side frame members may be secured to the top frame member 11 by screw bolts 20 and 27 passing through the engaging flanges of the side and top frame members.

The bottom frame member 10 is preferably a sheet metal stamping which is provided with a depending apron 28 formed with a plurality of corrugations 29 simulating shutters, and the apron 28 is adapted to enclose that portion of the radiator which extends below the shutters 26 so that the flow of air through the radiator may be controlled entirely by shutters 26. If necessary, the apron 28 may be provided with an aperture for a crank and an appropriate closure as shown in the above mentioned application, and in some embodiments of the invention the apron 29 may be eliminated entirely and the shutters made of dimensions adapted entirely to cover the front of the radiator.

The lower frame member 10 is formed with a transversely extending rib 30 and provided with an inwardly extending flange 31 adapted to provide a support for a bearing strip 32. At each end of the frame member 10 the flange 31 is turned up as at 33, to be secured to the body of the side frame members 12 and 13 by spot welding or other convenient fastening means, and the combined frame members 10 to 13 form a fenestration for receiving the pivotally mounted shutters 26.

The upper frame member 11 is preferably provided with a plurality of inwardly extending pressed bosses 34 having apertures 35 for receiving the reduced end 36 of the fixed members or rivets 37. The fixed members 37 comprise rivets having heads 38 and cylindrical body portions 39 adapted to be slidably received in apertures 40 in bearing strips 15, and the fixed members 37 are secured to upper frame member 11 by confining the body of the frame member between the annular shoulder 41 and the end of the rivet which is riveted over at 42.

A plurality of the fixed members 37 is provided to support the bearing strip 15 and the bearing strips may be provided with countersunk apertures 43 for receiving the heads 38 of the studs or rivets 37.

The bearing strip 15 is also provided with a plurality of bores 44 extending part way into the bearing strip and adapted to provide a seat for a helical coil spring 45 which is compressed between the bearing strip 15 and the upper frame member 11. The springs 45 thus resiliently urge the bearing strip 15 into engagement with the heads 38 of the studs 37 or into engagement with the trunnions of the shutters when the shutters are assembled with the frame. The bearing strips 15 are provided with a plurality of equally spaced apertures 46 comprising substantially cylindrical bores of substantially larger size than the cylindrical ends 47 of the shutter trunnions 48 and adapted to engage the frusto-conical portion 49 of the trunnions 48.

The shutters 26 may comprise sheet metal members each formed with a curled lateral edge 50 adapted to receive a trunnion 48 and provided with a complementary curved portion 51 at the opposite edge for engaging the curled edge 50 to effect a substantial closure when the shutters are in the position of Fig. 5. At one end the shutters are provided with rearwardly extending flanges 52 forming actuating arms and the flanges 52 of the respective shutters are pivotally secured by rivets 53 to an actuating bar 54 so that a plurality of the shutters 26 may be pivoted clockwise in Fig. 5 by moving the actuating bar 54 to the right to open the shutters.

The shutters and actuating bar being located beneath the upper frame member 11, this frame member is provided with an arcuate slot 55 and the actuating bar 54 is provided with a fixed stud 56 riveted thereto, projecting through the slot 55 and pivotally secured to an actuating link 57. The link 57 may be provided with a stud 58 riveted thereto, and a coil spring 59 may be tensioned between the stud 58 and a stud 60 riveted to the upper frame member 11.

It will thus be observed that the coil spring 59 is adapted to urge the actuating bar 54 to the position shown in Fig. 5 with the shutters closed, but the shutters may be opened by moving the actuating bar to the right against the tension of spring 59.

In the present embodiment, the frame member 11 has also been provided with a stud 61 riveted thereto and adapted pivotally to support a bell crank 62 which is pivotally connected with link 57 by rivet 63. The bell crank 62 is also pivotally connected by rivet 64 to a push rod 65, and the shutters may be actuated either by a thermostat actuating the push rod 65 or by manually moving the push rod 65 and securing it in any adjusted position.

The trunnions 48 may consist of rods extending through the curled or tubular portion 50 of shutters 26, to reinforce the shutters, or they may consist of relatively short rods frictionally secured in each end of the tubular portion 50. Each trunnion is thus provided with the cylindrical portion 66 frictionally engaged in the curled portion 50 of the shutter, and with the enlarged portion 67 forming an annular shoulder 68 engaging the end of the shutters. Extending from the enlarged portion 67 of trunnion 48, the trunnion is provided with a frusto-conical surface 49, and the extreme end 47 of trunnion 48 may be substantially cylindrical, but preferably of smaller size than the bearings 46 formed in the bearing strip 15.

Since the frusto-conical portion 49 of the trunnion engages in a cylindrical bore 46, the trunnion will be automatically centered in the bore 46 and there will be substantially a line contact between the bearing 46 and frusto-conical surface 49. This line contact surface is capable of pivotally supporting the shutters with a minimum of friction so that the shutters are more easily actuated by thermostatic devices, and any wear which takes place either in the bearing strip or upon the frusto-conical portion 39, is automatically taken up by the movement of the bearing strip 15 toward the frusto-conical surface 49.

The bearing strip 15 is itself preferably constructed of resilient metal such as spring bronze or other suitable metal, so that the bearing strip 15 is adapted to bend to compensate for irregularities in the dimensions of the respective shutters, to maintain the bearing strip in resilient engagement with the trunnions of each of the shutters. The upper frame member 11 may also be provided with apertures 69 registering with the ends 47 of trunnions 48 to permit the trunnions a maximum amount of axial movement.

The structure of the bearing strip for the lower ends of the shutters 26 may be substantially the same as that shown at the top in Fig. 6, in which case the flange 31 will be provided with enlarged apertures adapted to receive the enlarged portion 67 of the shutter trunnions 48, so that the frusto-conical portions 49 of the trunnions may engage the bearing strip 32 located beneath the flange 31. In some embodiments of the invention, however, the flange 31 of the frame member 10 may be provided with cylindrical bores adapted to form the bearings 46 of the lower bearing strip and engaged by frusto-conical surfaces on the lower trunnions, only one end of the shutter frame being provided with a resiliently supported bearing strip 15.

It will thus be observed that I have invented an improved shutter structure in which the shutter trunnions are provided with substantially a line contact surface capable of pivotally supporting shutters with a minimum of friction, and the shutter is also provided with a resiliently supported bearing strip capable of preventing any rattling of the movable shutter parts and adapted to compensate for any wear so that the wear will be automatically taken up. The bearing strip itself may also be made resilient to compensate for irregularities between the respective shutters and the device of the present invention is capable of giving long and efficient service, without requiring repairs or attention of any kind.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a radiator shutter for internal combustion engines, the combination of a supporting frame with a plurality of shutters mounted for pivotal movement in said frame, pivot members carried by said shutters and a bearing strip for supporting said pivot members, said bearing strip being mounted to resiliently engage said pivot members, said bearing strip having apertures to form bearings and said pivot members having frusto-conical bearing surfaces.

2. In a radiator shutter for internal combustion engines, the combination of a supporting frame with a plurality of shutters mounted for pivotal movement in said frame, pivot members carried by said shutters, a bearing strip for supporting said pivot members, said bearing strip being mounted to resiliently engage said pivot members, and stop members for securing said bearing strip to said frame.

3. In a radiator shutter for internal combustion engines, the combination of side and end frame members forming a fenestration, with a plurality of fixed members carried by one of said end frame members, a bearing strip slidably mounted on said fixed members, and a plurality of shutters pivotally mounted in said bearing strip.

4. In a radiator shutter for internal combustion engines, the combination of side and end frame members forming a fenestration, with a plurality of fixed members carried by one of said end frame members, a bearing strip slidably mounted on said fixed members, a plurality of shutters pivotally mounted in said bearing strip, and spring means tensioned between said bearing strip and said end frame member.

5. In a radiator shutter for internal combustion engines, the combination of side and end frame members forming a fenestration, with a plurality of fixed members carried by one of said end frame members, a bearing strip slidably mounted on said fixed members, a plurality of shutters pivotally mounted in said bearing strip, and stop members carried by said fixed members to limit movement of said bearing strip away from said end frame member.

6. In a radiator shutter for internal combustion engines, the combination of side and end frame members forming a fenestration, with a plurality of fixed members carried by one of said end frame members, a bearing strip slidably mounted on said fixed members, a plurality of shutters pivotally mounted in said bearing strip, stop members carried by said fixed members to limit movement of said bearing strip away from said end frame member, said bearing strip being formed with sockets and coil springs compressed between said strip and end frame member and seated in said sockets.

7. In a radiator shutter for internal combustion engines, the combination of side and end frame members forming a fenestration, with a plurality of fixed members carried by one of said end frame members, a bearing strip slidably mounted on said fixed members, a plurality of shutters pivotally mounted in said bearing strip, said bearing strip being formed with apertures for bearings, and trunnions carried by said shutters and having frusto-conical surfaces engaging in said apertures.

8. In a radiator shutter for internal combustion engines, the combination of side and end frame members forming a fenestration, with a plurality of fixed members carried by one of said end frame members, a bearing strip slidably mounted on said fixed members, a plurality of shutters pivotally mounted in said bearing strip, said bearing strip being formed with apertures for bearings, and trunnions carried by said shutters and having frusto-conical surfaces engaging in said apertures, said bearing strip being resilient to compensate for irregularities in the dimensions of said shutters.

9. In a radiator shutter, the combination of a pair of sheet metal end frame members, with channeled metal side frame members, studs riveted to said end frame members and having heads, resilient bearing strips slidably mounted on said studs, and shutters journaled in said bearing strips.

10. In a radiator shutter, the combination of a pair of sheet metal end frame members, with channeled metal side frame members, studs riveted to said end frame members and having heads, resilient bearing strips slidably mounted on said studs, shutters journaled in said bearing strips, said bearing strips having cylindrical apertures for bearings, and trunnions having frusto-conical surfaces carried by said shutters.

11. In a radiator shutter, the combination of a frame, with a plurality of shutters movably mounted in said frame to regulate the flow of air through said frame, trunnions on said shutters, and bearing members carried by said frame for said trunnions, said bearing members being movably mounted and adapted to compensate for circumferential bearing and circumferential trunnion wear.

12. In a radiator shutter, the combination of a frame, with a plurality of shutters movably mounted in said frame to regulate the flow of air through said frame, trunnions on said shutters, and bearing members carried by said frame for said trunnions, said bearing members being movably mounted to compensate for circumferential bearing and circumferential trunnion wear and said bearings and trunnions being formed to effect constant bearing fit by movement of said bearing members axially with respect to said trunnions.

13. In a radiator shutter, the combination of a frame, with a plurality of shutters movably mounted in said frame to regulate the flow of air through said frame, trunnions on said shutters, bearing members carried by said frame for said trunnions, said bearing members being movably mounted to compensate for bearing and trunnion wear and said bearings and trunnions being formed to effect constant bearing fit by movement of said bearing members, and means for automatically moving said bearing members to compensate for wear.

14. In a radiator shutter, the combination of a frame, with a plurality of shutters movably mounted in said frame to regulate the flow of air through said frame, frusto-conical trunnions on said shutters, and resilient means for journalling said shutters and for automatically compensating for circumferential wear to prevent rattling.

15. In a radiator shutter, the combination of a frame, with a plurality of shutters movably mounted in said frame to regulate the flow of air through said frame, trunnions on said shutters, a pair of fixed studs carried by said frame, and a bearing strip slidably mounted on said fixed studs for said shutters.

16. In a radiator shutter, the combination of a frame, with a plurality of shutters movably mounted in said frame to regulate the flow of air through said frame, trunnions on said shutters, a pair of fixed studs carried by frame, a bearing strip slidably mounted on said fixed studs for said shutters, and resilient means confined between said bearing strip and said frame to urge said bearing strip into engagement with parts of said shutters.

17. In a radiator shutter, the combination of a frame, with a plurality of shutters movably mounted in said frame to regulate the flow of air through said frame, trunnions on said shutters, a pair of fixed studs carried by said frame, a bearing strip slidably mounted on said fixed studs for said shutters, resilient means confined between said bearing strip and said frame to urge said bearing strip into engagement with parts of said shutters, and heads carried by said studs and engaging said bearing strip to hold said strip in assembly with said frame and limit the movement of said strip.

18. In a radiator shutter, the combination of a frame, with a plurality of shutters movably mounted in said frame to regulate the flow of air through said frame, trunnions on said shutters, a pair of fixed studs carried by said frame, a bearing strip slidably mounted on said fixed studs for said shutters, resilient means confined between said bearing strip and said frame to urge said bearing strip into engagement with parts of said shutters, and trunnions carried by said shutters and having tapered surfaces for engaging said bearing strips.

19. In a radiator shutter, the combination of a frame, with a plurality of shutters movably mounted in said frame to regulate the flow of air through said frame, frusto-conical trunnions on said shutters, bearing members carried by said frame for said trunnions, said bearing members being movably mounted to compensate for bearing and trunnion wear, and means for automatically moving said bearing members to compensate for wear.

In witness whereof, I hereunto subscribe my name this 25 day of April, 1929.

FRED GOLDFISHER.